United States Patent [19]

Galonska

[11] Patent Number: 5,014,579
[45] Date of Patent: May 14, 1991

[54] TUBE CUTTING APPARATUS AND METHODS

[75] Inventor: David A. Galonska, Saginaw, Mich.

[73] Assignee: Arrow Paper Products Company, Saginaw, Mich.

[21] Appl. No.: 315,935

[22] Filed: Feb. 27, 1989

[51] Int. Cl.⁵ .............................. B23B 1/00
[52] U.S. Cl. ............................. 82/47; 82/54; 82/56; 493/288
[58] Field of Search ............ 82/56, 47, 101, 95, 82/54, 46, 92, 93, 97, 164; 493/288, 289, 290

[56] References Cited

U.S. PATENT DOCUMENTS 3,862,710 1/1975 Bivona et al.
4,302,958 12/1981 Andriessen et al. .............. 82/56
4,748,880 6/1988 Languillat .

Primary Examiner—Frederick R. Schmidt
Assistant Examiner—Lawrence Cruz
Attorney, Agent, or Firm—Learman & McCulloch

[57] ABSTRACT

A tube supported on a rotating mandrel is cut by a pair of cutter blades spaced apart a distance corresponding substantially to the diameter of the mandrel and which are moved simultaneously in a direction toward the mandrel and transversely of its axis of rotation a distance sufficient to enable the cutters to engage the tube at circumferentially spaced zones and sever the wall of the tube. The cutters move along a path that is tangential, rather than radial, relative to the mandrel.

28 Claims, 2 Drawing Sheets

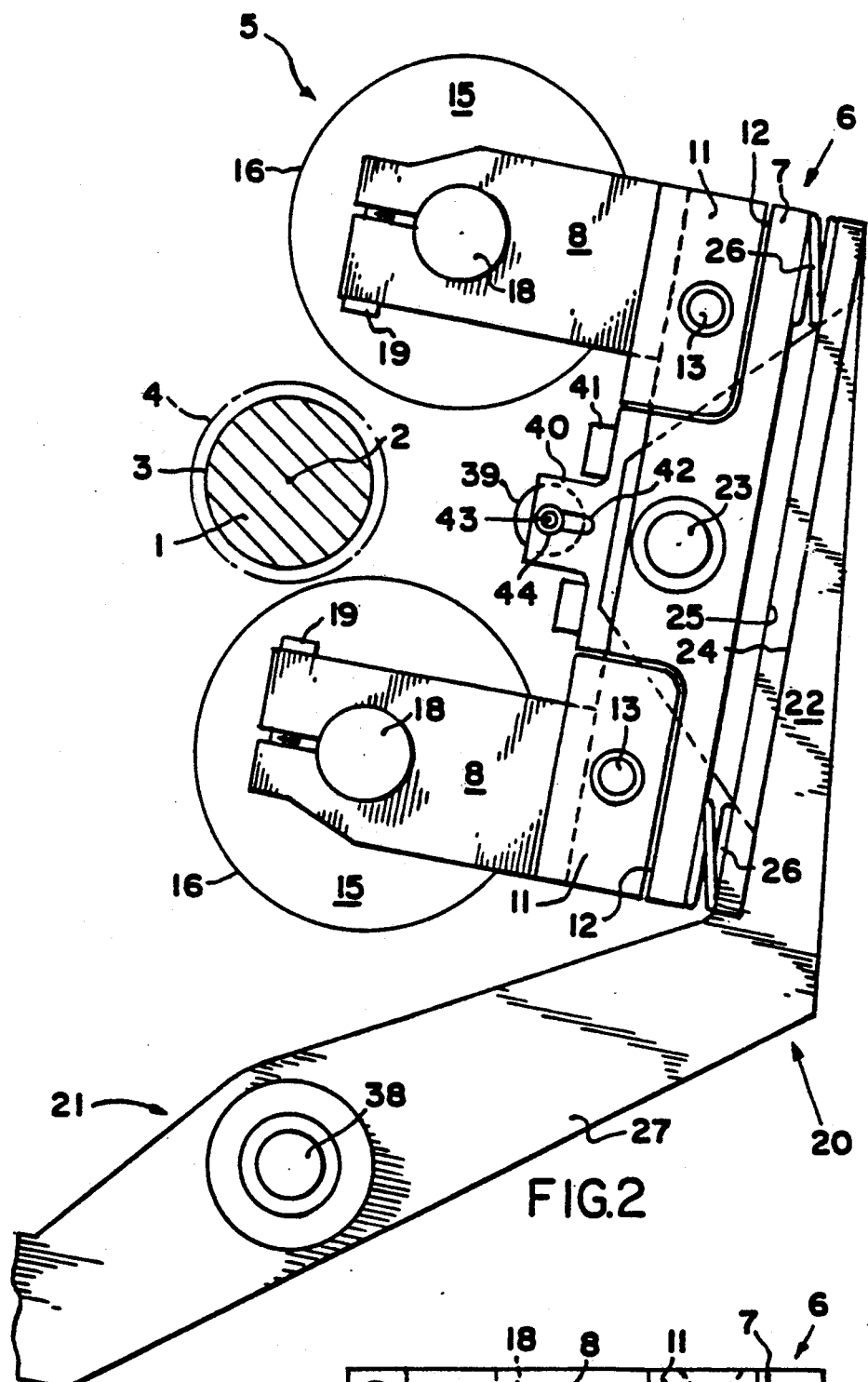
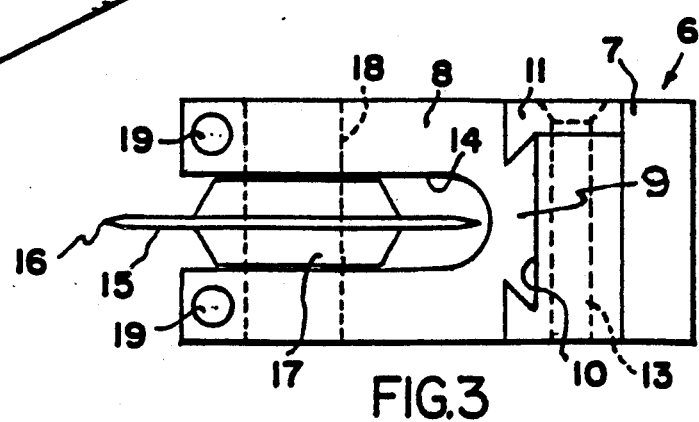
FIG.2
FIG.3

TUBE CUTTING APPARATUS AND METHODS

This invention relates to methods and apparatus for cutting tubes and more particularly the cutting of tubes supported on a rotating mandrel.

BACKGROUND OF THE INVENTION

Tubes formed of paper and similar materials conventionally are supported and cut on a cylindrical mandrel which rotates about an axis. At periodic intervals the tube is cut to form a shorter tube or core of selected length which subsequently is removed from the mandrel.

It has been the practice heretofore to cut a tube supported on a mandrel by means of a disc having a cutting edge at its periphery and which is rotatable about its own axis in response to engagement of the cutting edge with the wall of the tube. The cutting disc conventionally is mounted alongside the mandrel for movement substantially radially of the axis of rotation of the mandrel into and out of engagement with the tube. It is necessary that the cutter be moved toward the mandrel a distance sufficient to cut through, or nearly through, the tube wall so as to enable the cut length of tubing to be separated cleanly from the remainder of the tube.

In practice, the cutting edge of the cutter moves into engagement with the mandrel itself, thereby causing dulling of the cutting edge, scoring of the mandrel, or both. These undesirable results are due to a number of factors, among which is the difficulty in stopping movement of the cutter in a direction toward the mandrel in a position in which the cutting edge of the cutter barely engages the mandrel. Such positioning of the cutting edge during a cutting operation is difficult because of problems in defining the precise limit of movement of the cutter toward the mandrel, variations in diameter of the mandrel, and eccentricity of the axis about which the mandrel rotates.

Since the conventional tube cutting mechanisms invariably cause the cutting edges of the cutters to engage the mandrel, and since the force with which the cutting edges engage the mandrel cannot be controlled precisely, dulling of the cutting edges occurs rapidly thereby necessitating frequent renewing of the cutting edges if the severed tubular sections are to conform to predetermined specifications.

An object of the invention is to provide methods and apparatus which overcome or greatly minimize the disadvantages referred to above.

SUMMARY OF THE INVENTION

The method and apparatus according to the invention enable a tube supported on a rotating mandrel to be cut by moving a cutter transversely of the axis of rotation of the mandrel and spaced from such axis a distance such that the cutting edge of the cutter which confronts the mandrel moves along a path that is substantially tangential to the surface of the mandrel, thereby effecting cutting of the wall of the tube without necessarily requiring physical engagement between the mandrel and the cutting edge of the cutter. Since the path of movement of the confronting cutting edge of the cutter is tangential to the surface of the mandrel, rather than radially of the mandrel's axis of rotation, the length of travel of the cutter toward and away from the mandrel need not be as precisely controlled as would be the case if the cutter moved radially of the axis of rotation.

The preferred embodiment of the invention utilizes a pair of cutters supported on a yoke in such manner that the cutters straddle the mandrel and a tube supported thereon with the spacing between the confronting cutting edges of the cutters corresponding substantially to the diameter of the mandrel. Thus, as the cutters move transversely of the axis of rotation of the mandrel and in direction to enable the cutters to straddle the mandrel, the confronting cutting edges simultaneously engage the tube supported on the mandrel and cut the tube wall.

In the preferred embodiment the support on which the cutters are carried is mounted for rocking movements about an axis that is parallel to the axis of rotation of the mandrel. As a consequence the cutters themselves are capable of bodily movement radially of the mandrel so as to compensate for eccentricities in the axis about which the mandrel rotates, thereby avoiding any appreciable, forcible engagement of the cutting edge of either cutter with the surface of the mandrel.

In the preferred embodiment the cutters are reciprocable or oscillatable into and out of cutting engagement with the tube by means of actuating means which operate periodically.

THE DRAWINGS

Apparatus constructed in accordance with a preferred embodiment of the invention is disclosed in the accompanying drawings, wherein:

FIG. 2 is a view similar to FIG. 1, but illustrating the apparatus in its inactive position; and FIG. 3 is an end elevational view of the cutter support.

DETAILED DESCRIPTION

Figure 1:
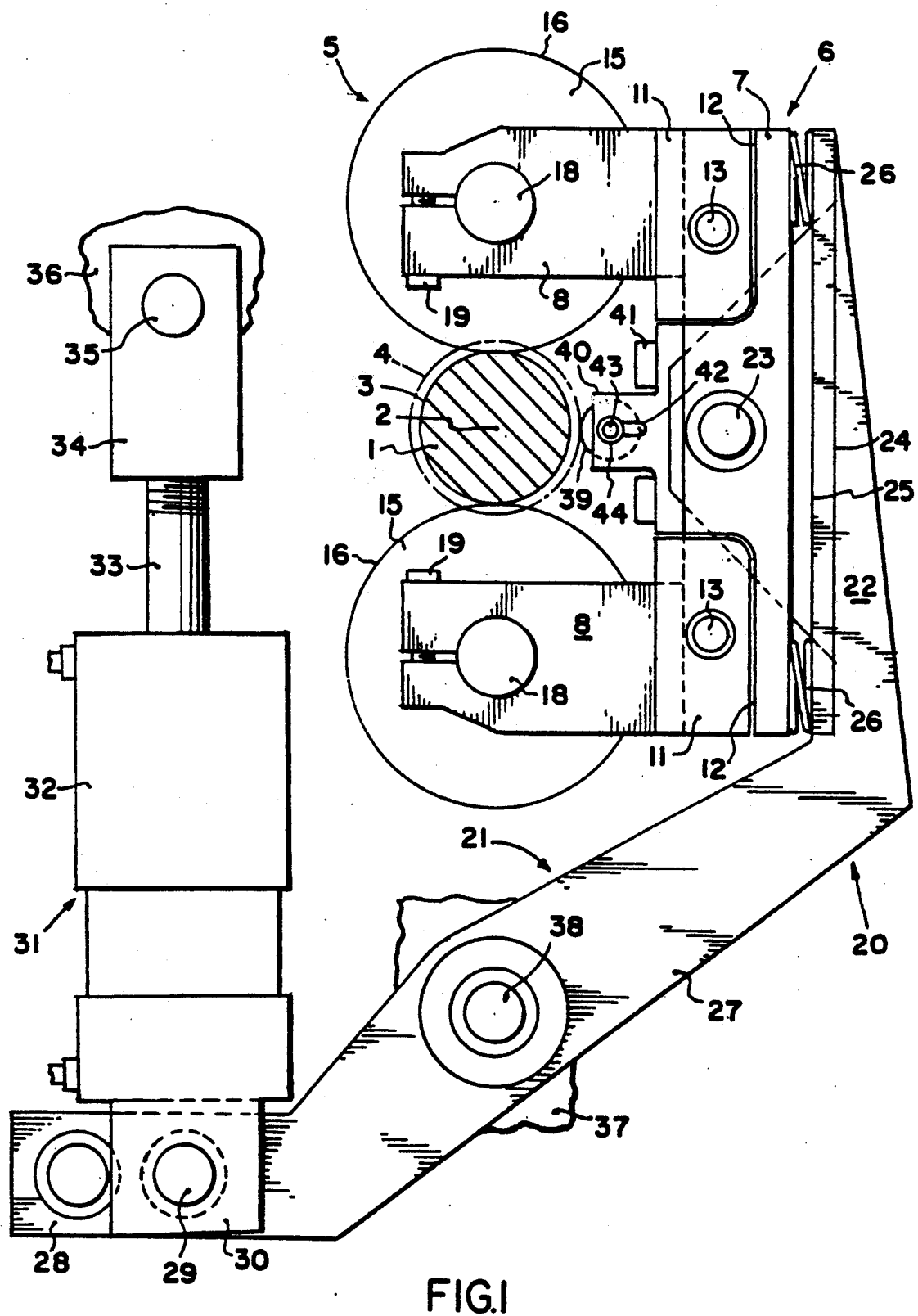
FIG. 1 is a fragmentary, side elevational view of the tube cutting apparatus in tube cutting position.

Apparatus constructed in accordance with the invention is adapted for use in conjunction with a tube winding machine of conventional, well known construction having a cylindrical mandrel 1 which is rotatable about its own longitudinal axis 2 and has a peripheral surface 3 about which a tube 4 of paper or similar material may be wound.

Cutting apparatus constructed according to the invention is designated generally by the reference character 5 and comprises a support or yoke 6 having a body 7 from opposite ends of which extend substantially parallel arms 8. That end of each arm 8 which confronts the body 7 has a dovetail projection 9 that is accommodated in a complementally shaped slot 10 formed in part by a keeper 11 which is accommodated in a groove 12 formed in one side of the body 7. An anchor bolt 13 maintains the keeper 11 tightly clamped against the arm 8 so as to fix the latter in any selected one of a number of adjusted positions.

The opposite or free end of each of the arms 8 is bifurcated to form a groove 14 for the accommodation of a cutter blade 15 having a cutting edge 16. Also accommodated in the groove 14 is a bearing 17 by means of which the blade 15 is journalled on an axle 18 that extends through the arm 8 and is maintained in fixed position relative thereto by a clamping screw 19.

The construction and arrangement of the parts of the cutting apparatus thus far described are such that the arms 8 extend beyond the confines of the body 7 and are adjustable toward and away from one another so as to locate the confronting cutting edges 16 of the two cutters a predetermined distance apart. Preferably, the spacing between the confronting cutting edges 16 corresponds substantially to the diameter of the mandrel 1. The spacing between the confronting cutting edges 16 of the cutter preferably is such that the cutting edges 16 confronting the mandrel barely engage the outer surface of the mandrel. Preferably the support 6 of the cutting apparatus is mounted for movements to and from its tube cutting position by operating means which may be actuated at predetermined intervals. One suitable form of operating means is designated generally by the reference character 20 and comprises a lever 21 having one arm 22 pivoted to the body 7 by means of a pivot pin 23 which is located midway between opposite ends of the body. The arm 22 has a ledge 24 which is parallel to and spaced from the adjacent side 25 of the body 7. In the space between the ledge 24 and the side 25 and at opposite ends of such space are springs 26 which normally bias the body 7 to a position in which the confronting surfaces of the ledge 24 and the side 25 are parallel, but which enable the body 7 to rock about the axis of the pivot 23. The purpose of this construction will be explained shortly.

The operating lever 21 has a second arm 27 that terminates in an extension 28 joined by a pin 29 to a fitting 30 carried by one end of an actuating ram 31 comprising a double acting fluid cylinder 32 coupled to a source of pressure fluid and within which is a piston (not shown) having a piston rod 33 adjustably coupled to a fitting 34 that is pivoted by a pin 35 to a frame member 36 of the tube winding machine. The lever 21 is pivoted between its arms to another frame member 37 of the winding machine by means of a pin 38 so as to rock in opposite directions in response to extension and contraction of the actuating ram 31. The extent of rocking movement of the lever 21 and, consequently, the rocking movement of the cutter support 6, depends upon the distance between the pivot pins 29 and 35 of the ram 31, and this distance may be varied by rotary adjustment of the piston rod 33 relative to the fitting 34.

When the apparatus is conditioned for operation, the arms 8 which support the cutters 15 will be so adjusted that the minimum distance between the cutting edges 16 corresponds substantially to the diameter of the mandrel 1 and the axis of the pivot pin 23 is substantially equidistant from the axes of the cutter axles 18. Preferably, the space between the ledge 24 and the confronting end 25 of the body 7 is substantially uniform from end to end.

During winding of the tube 4, the cutting apparatus occupies an inactive position shown in FIG. 2 in which the cutters 15 are alongside of, but do not engage, the tube. When it is desired to sever the tube, however, the actutor ram 31 is operated to rock the lever 21 counterclockwise about its pivot 38, thereby moving the cutter support 6 in a direction transversely of the axis of rotation of the mandrel 1 and toward the latter. As the cutter apparatus moves toward the mandrel, the confronting cutting edges 16 of the cutters 11 will move simultaneously along parallel paths that are tangential, rather than radial, relative to the mandrel 1. Since the confronting cutting edges are spaced apart a distance corresponding substantially to the diameter of the mandrel, the spacing between the confronting cutting edges 16 is less than that of the diameter of the tube 4. Consequently, the confronting cutting edges will engage the tube at peripherally spaced zones and cut the wall of the tube, thereby severing a length of the tube from the remainder.

When the cutting operation has been completed, the actuating ram 31 will be reactivated to return the cutting mechanism 5 from the position shown in FIG. 1 to the posit on shown in FIG. 2.

It is not necessary that the cutters 15 be moved transversely of and toward the mandrel a distance greater than that required to locate the axis of the mandrel 1 and the axes of the axles in a common plane. Movement of the cutters to this extent may be limited by adjustment of the piston rod 33 of the ram 31 relative to the fitting 34, as has been explained, and it also can be limited by means of a roller 39 journalled in a bracket 40 secured to the body 7 by bolts 41. The roller 39 is mounted in a position to engage the tube 4 when the cutting of the wall thereof has been completed, as is shown in FIG. 1.

To enable the movement limiting roller 39 to be adapted for use with tubes of different diameters, the bracket 40 may be provided with a slot 42 through which the shaft 43 of the bracket may project and permit adjustments of the roller 39 toward and away from the pivot 23. Suitable retainers 44 maintain the roller 39 in a selected position of adjustment.

Since the cutter support or yoke 6 is rockable about the axis of the pivot 23 the apparatus is capable of accommodating a mandrel which rotates about an eccentric axis. Thus, if the rotation of the mandrel 1 is orbital relative to the axis 2 engagement of either of the cutters 15 in advance of the other with the outer surface of the tube 4 will cause bodily rocking of the yoke 6 about the axis of the pivot 23 thereby preventing the cutting edge 16 of the engaged cutter 15 from bearing against the surface of the mandrel, while simultaneously causing the other cutter 15 also to engage and sever the wall of the tube 4. Such movement of the yoke 6 is possible because of the space between the ledge 24 and the confronting end 25 of the support 6. Thus, regardless of an eccentricity in the axis about which the mandrel rotates, the apparatus automatically compensates for such eccentricity without causing engagement between the cutting edges of the cutters and the mandrel.

The disclosed method and apparatus are representative of presently preferred forms of the invention, but are intended to be illustrative rather than definitive thereof. The invention is defined in the claims.

I claim:

1. Apparatus for cutting the wall of a cylindrical tube supported on a mandrel rotatable about an axis, said apparatus comprising support means; means mounting said support means for movement transversely of said axis toward and away from said mandrel; at least one cutter having a cutting edge confronting said mandrel; and means mounting said cutter on said support means for movement therewith and in such position that as said support means moves transversely of said axis toward said mandrel the confronting edge of said cutter moves along a path that is spaced from said axis an amount corresponding substantially to half the thickness of said mandrel and substantially tangential to said mandrel, thereby effecting cutting of said wall.

2. Apparatus according to claim 1 including operating means for moving said support means transversely of said axis.

3. Apparatus according to claim 1 including a second cutter having a cutting edge; and means mounting said second cutter on said support means for movements therewith and diametrically opposed to the first mentioned cutter with the cutting edges of said cutters confronting one another, said confronting cutting edges being spaced apart a distance corresponding substantially to the thickness of said mandrel.

4. Apparatus according to claim 3 including means mounting each of said cutters for rotation about substantially parallel axes.

5. Apparatus according to claim 3 wherein the cutting edges of said cutters are substantially coplanar.

6. Apparatus according to claim 3 including means for adjusting said cutters relative to said support means for varying the distance between said confronting cutting edges.

7. Apparatus according to claim 1 including means for limiting movement of said support means toward said mandrel.

8. Apparatus for cutting a tube supported on a mandrel rotatable about an axis, said apparatus comprising support means; a pair of cutters each of which has a cutting edge; means mounting said cutters on said support means in fixed spaced apart positions with the respective cutting edges confronting one another and extending beyond said support means a distance to accommodate said mandrel between said confronting cutting edges, the spacing between said cutters being such that the minimum distance between said confronting cutting edges corresponds substantially to the thickness of said mandrel; and operating means for moving said support means relative to said axis to and from a position in which said cutters straddle said mandrel, thereby enabling said confronting cutting edges to engage and cut said tube.

9. Apparatus according to claim 8 including limit means carried by said support means and interposed between said cutters in a position to engage a tube on said mandrel.

10. Apparatus according to claim 9 wherein said limit means is substantially equidistant from the confronting cutting edges of said cutters.

11. Apparatus according to claim 8 including actuating means connected to said operating means for moving the latter.

12. Apparatus according to claim 11 including limit means for limiting movement of said support means in a direction toward said axis.

13. Apparatus according to claim 12 wherein said limit means is carried by said support means in a position to engage a tube on said mandrel.

14. Apparatus according to claim 12 wherein said limit means comprises a part of said actuating means.

15. Apparatus for cutting a tube supported on a mandrel rotatable about an axis, said apparatus comprising a support yoke having a pair of spaced apart arms; a pair of cutters each of which has a cutting edge, one of said cutters being mounted on one of said arms and the other of said cutters being mounted on the other of said arms and spaced from said one of said cutters, said cutters having cutting edges extending beyond said support means and confronting one another, the spacing between said cutters being such that the minimum distance between said confronting cutting edges corresponds substantially to the thickness of said mandrel; and means mounting said yoke for rocking movements about an axis between said arms.

16. Apparatus according to claim 15 wherein the cutting edges of said cutters are substantially coplanar.

17. Apparatus according to claim 15 wherein said cutters are rotatable.

18. Apparatus according to claim 15 including means mounting said yoke for rocking movement about an axis between said arms.

19. Apparatus according to claim 15 including means for adjusting said cutters relative to said support means for varying the distance between the confronting cutting edges of said cutters.

20. A method of cutting the wall of a cylindrical tube on a mandrel rotating about an axis, said method comprising moving a cutter having a cutting edge confronting said mandrel relative to said mandrel and transversely of said axis while said tube and mandrel are rotating and at such a distance from said axis that said confronting cutting edge moves along a path spaced from said axis by substantially half the thickness of said mandrel and substantially tangential to said mandrel, whereby said confronting cutting edge moves into engagement with said tube and cuts said well.

21. The method according to claim 20 including simultaneously moving a second cutter having a cutting edge confronting and diametrally opposed to the confronting cutting edge of the first-mentioned cutter relative to said mandrel and at such a distance from said axis that the confronting cutting edge of said second cutter moves along a parallel path substantially tangential to said mandrel into engagement with said tube and cuts said well at a zone circumferentially spaced from that at which the confronting cutting edge of the first-mentioned cutter engages said wall.

22. The method according to claim 21 wherein the cutting edges of said cutters are substantially coplanar.

23. The method according to claim 21 including bodily rocking said cutters conjointly to a position in which the confronting cutting edge of each of said cutters simultaneously engages the wall of said tube.

24. Apparatus for cutting the wall of a cylindrical tube supported on a mandrel rotatable about an axis and having a peripheral surface, said apparatus comprising support means; a first cutter having a cutting edge; a second cutter having a cutting edge; means mounting said first and second cutters on said support means with the respective cutting edges confronting and spaced from one another a distance corresponding substantially to the thickness of said mandrel; and means mounting said support means for conjoint movements of said cutters in the same direction transversely of said axis toward and away from a position in which said first and second cutters straddle said mandrel, whereby as said cutters move toward said position said confronting cutting edges cut the wall of said tube.

25. Apparatus according to claim 24 wherein the means mounting said support means is pivotal, thereby enabling rocking movement of said support means and said cutters between two extreme positions.

26. Apparatus according to claim 25 including spring means acting on said support means and biasing the latter to a predetermined position between said extreme positions.

27. A method of cutting the wall of a rotating, cylindrical tube supported on a mandrel, said method comprising simultaneously moving transversely of said mandrel and into straddling engagement with said tube a pair of cutters having confronting cutting edges spaced apart a distance corresponding substantially to the thickness of said mandrel and along parallel paths that are substantially tangential to opposite sides of said mandrel.

28. The method according to claim 27 including bodily rocking said cutters conjointly to a position in which the confronting cutting edge of each of said cutters simultaneously engages the wall of said tube.

* * * * *

UNITED STATES PATENT AND TRADEMARK OFFICE
CERTIFICATE OF CORRECTION

PATENT NO. : 5,014,579
DATED : May 14, 1991
INVENTOR(S) : David A. Galonska

It is certified that error appears in the above-identified patent and that said Letters Patent is hereby corrected as shown below:

Column 2, line 7, after "in" insert -- a --.

Column 3, line 60, cancel "11".

Column 6, line 17, change "well" to -- wall --; line 25, change "well" to -- wall --.

Signed and Sealed this

First Day of September, 1992

*Attest:*

DOUGLAS B. COMER

*Attesting Officer*   Acting Commissioner of Patents and Trademarks